US012607858B2

(12) United States Patent
    Gao

(10) Patent No.: US 12,607,858 B2
(45) Date of Patent: Apr. 21, 2026

(54) NEAR-TO-EYE DISPLAY OPTICAL SYSTEM AND OPTICAL FILTER

(71) Applicant: GUANGDONG OPPO MOBILE TELECOMMUNICATIONS CORP., LTD., Dongguan (CN)

(72) Inventor: Zhenyu Gao, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 331 days.

(21) Appl. No.: 18/452,655

(22) Filed: Aug. 21, 2023

(65) Prior Publication Data

US 2023/0393404 A1 Dec. 7, 2023

Related U.S. Application Data

(63) Continuation of application No. PCT/CN2022/075908, filed on Feb. 10, 2022.

(30) Foreign Application Priority Data

Mar. 17, 2021 (CN) .......................... 202110285802.1

(51) Int. Cl.
    *G02B 27/01* (2006.01)
(52) U.S. Cl.
    CPC .. *G02B 27/0172* (2013.01); *G02B 2027/0178* (2013.01)
(58) Field of Classification Search
    CPC ................................................. G02B 27/0172
    See application file for complete search history.

(56) References Cited

U.S. PATENT DOCUMENTS

| | | | |
|---|---|---|---|
| 7,042,610 | B1 | 5/2006 | Berman |
| 2012/0013961 | A1 | 1/2012 | Minabe et al. |

(Continued)

FOREIGN PATENT DOCUMENTS

| | | |
|---|---|---|
| CN | 108181709 A | 6/2018 |
| CN | 109521508 A | 3/2019 |

(Continued)

OTHER PUBLICATIONS

Chinese First Office Action, Chinese Application No. 202110285802.1, mailed Jun. 10, 2022 (22 pages).

(Continued)

*Primary Examiner* — Edmond C Lau
(74) *Attorney, Agent, or Firm* — Ladas & Parry LLP

(57) ABSTRACT

A near-to-eye display optical system includes a display assembly, an optical filter, a first optical assembly, and a second optical assembly. The display assembly is configured to emit light rays having image information. The optical filter is configured to transmit the light rays whose emergent angles meet a preset transmission condition and shield the light rays whose emergent angles do not meet the preset transmission condition. The first optical assembly is configured to receive and reflect the light rays transmitted through the optical filter, wherein the optical filter is disposed between the display assembly and the first optical assembly. The second optical assembly is configured to receive the light rays reflected by the first optical assembly and reflect the light rays to the first optical assembly. The present application further provides an optical filter and a near-to-eye display device.

18 Claims, 8 Drawing Sheets

(56) References Cited

U.S. PATENT DOCUMENTS

| | | | |
|---|---|---|---|
| 2015/0205035 A1 | 7/2015 | Border et al. | |
| 2018/0098056 A1* | 4/2018 | Bohn | G02B 27/017 |
| 2019/0212482 A1 | 7/2019 | Richards | |
| 2020/0103650 A1 | 4/2020 | Woods | |
| 2020/0294190 A1* | 9/2020 | Shin | G02B 27/0075 |

FOREIGN PATENT DOCUMENTS

| | | | |
|---|---|---|---|
| CN | 110146978 A | 8/2019 |
| CN | 110161684 A | 8/2019 |
| CN | 110618529 A | 12/2019 |
| CN | 110873967 A | 3/2020 |
| CN | 111308715 A | 6/2020 |
| CN | 111638602 A | 9/2020 |
| CN | 112163482 A | 1/2021 |
| CN | 113009697 A | 6/2021 |
| JP | 2013257529 A | 12/2013 |
| WO | 2015098558 A1 | 7/2015 |
| WO | 2017070417 A1 | 4/2017 |
| WO | 2018225714 A1 | 12/2018 |
| WO | 2019161219 A1 | 8/2019 |

OTHER PUBLICATIONS

Chinese second Office Action, Chinese Application No. 202110285802. 1, mailed Oct. 31, 2022 (26 pages).

Chinese Third Office Action, Chinese Application No. 202110285802. 1, mailed Feb. 21, 2023 (28 pages).

Chinese Fourth Office Action, Chinese Application No. 202110285802. 1, mailed May 25, 2023 (34 pages).

International Search Report, International Application No. PCT/ CN2022/075908, mailed May 7, 2022 (17 pages).

Chinese Rejection decision, Application No. 202110285802. 1,mailed Aug. 12, 2023 (33 pages).

European Search Report, European Patent Application No. 22770235. 4, mailed Jun. 26, 2024 (8 pages).

* cited by examiner

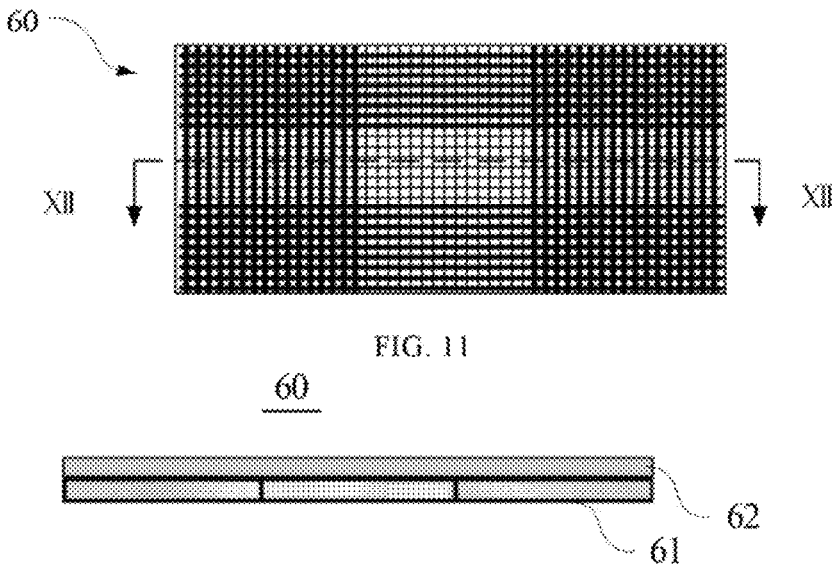
FIG. 11
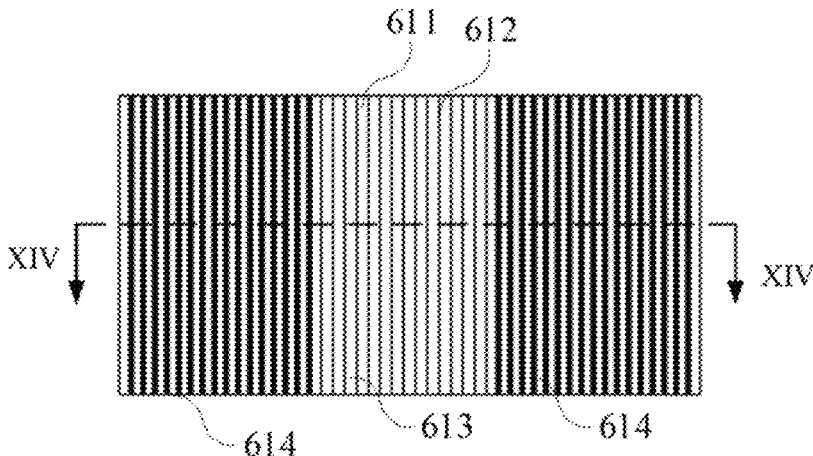
FIG. 12
FIG. 13
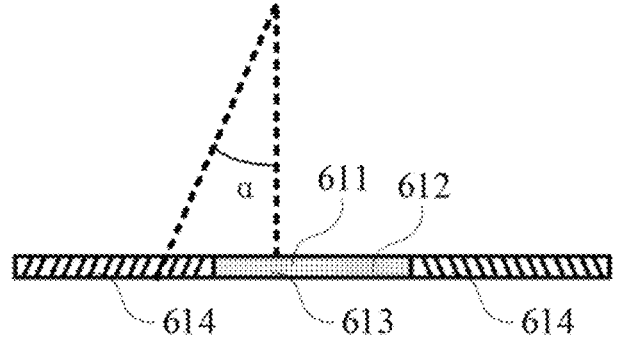
FIG. 14

NEAR-TO-EYE DISPLAY OPTICAL SYSTEM AND OPTICAL FILTER

CROSS-REFERENCE TO RELATED APPLICATIONS

The present application is a continuation of International Patent Application No. PCT/CN2022/075908, filed Feb. 10, 2022, which claims the priority of Chinese Patent Application No. 202110285802.1, filed Mar. 17, 2021, both of which are herein incorporated by reference in their entirety.

TECHNICAL FIELD

The present disclosure relates to the field of optical technologies, and in particular to a near-to-eye display optical system, an optical filter and a near-to-eye display device.

BACKGROUND

With the popularization of technologies such as virtual reality (VR) technology and augmented reality (AR) technology, near-to-eye display devices continue to emerge. The imaging quality of the near-to-eye display device has become the focus of consumers' attention. During using the near-to-eye display device, it is found that stray lights appear on the upper side and lower side of the field of view, and the stray lights also appear inside and outside of the field of view.

SUMMARY OF THE DISCLOSURE

In an aspect, an embodiment of the present disclosure provides a near-to-eye display optical system which includes a display assembly, an optical filter, a first optical assembly, and a second optical assembly. The display assembly is configured to emit light rays having image information. The optical filter is configured to transmit the light rays whose emergent angles meet a preset transmission condition and shield the light rays whose emergent angles do not meet the preset transmission condition. The first optical assembly is configured to receive and reflect the light rays transmitted through the optical filter, wherein the optical filter is disposed between the display assembly and the first optical assembly. The second optical assembly is configured to receive the light rays reflected by the first optical assembly and reflect the light rays to the first optical assembly, wherein the light rays reflected by the second optical assembly pass through the first optical assembly to form an image on a focal plane of the near-to-eye display optical system.

In an aspect, an embodiment of the present disclosure provides an optical filter including an optical sub-filter that includes a plurality of transparent layers and a plurality of light shielding layers. The optical sub-filter is configured to transmit light rays whose incident angles meet a preset transmission condition, the incident angles are included angles between the light rays and a first direction. The plurality of transparent layers and the plurality of light shielding layers are stacked in a second direction, and the first direction is perpendicular to the second direction. The plurality of transparent layers and the plurality of light shielding layers are mutually connected, one of the plurality of light shielding layers is disposed between adjacent two of the plurality of transparent layers, and one of the plurality of transparent layers is disposed between adjacent two of the plurality of light shielding layers. The plurality of transparent layers is configured to transmit the light rays whose incident angles meet the preset transmission condition, the plurality of light shielding layers is configured to shield light rays including first light rays, and the first light rays are the light rays whose incident angles do not meet the preset transmission condition.

In an aspect, an embodiment of the present disclosure provides an optical filter including a plurality of transparent parts, a plurality of first light shielding parts, and a plurality of second light shielding parts. The plurality of transparent parts is disposed on a plane perpendicular to a first direction, and configured to transmit light rays whose incident angles meet a preset transmission condition. The incident angle is an included angle between the light rays and the first direction. The plurality of first light shielding parts is disposed at intervals and configured to shield light rays whose incident angles do not meet the preset transmission condition. One of the plurality of first light shielding parts is disposed between adjacent two of the plurality of transparent parts, and one of the plurality of transparent part is disposed between adjacent two of the plurality of first light shielding parts. The plurality of second light shielding parts is disposed at intervals and configured to shield the light rays whose incident angles do not meet the preset transmission condition. One of the plurality of second light shielding parts is disposed between adjacent two of the plurality of transparent parts, one of the plurality of transparent parts is disposed between adjacent two of the plurality of second light shielding parts, and each of the plurality of second light shielding parts and each of the plurality of first light shielding parts are disposed in a crossing manner.

BRIEF DESCRIPTION OF THE DRAWINGS

In order to more clearly illustrate the technical solutions in the implementations of the present disclosure, the accompanying drawings needed to be used in the description of the embodiments will be briefly introduced below. Obviously, the accompanying drawings in the following description are only some embodiments of the present disclosure. For one of ordinary skill in the art, other accompanying drawings can also be obtained according to the accompanying drawings on the premise of without any creative efforts.

FIG. 11 is a structural schematic view of an optical filter of an embodiment illustrated in FIG. 8 of the present disclosure.

FIG. 12 is a XII-XII cross-sectional schematic view of the optical filter of an embodiment illustrated in FIG. 11 of the present disclosure.

FIG. 13 is a structural schematic view of an optical sub-filter of an embodiment illustrated in FIG. 12 of the present disclosure.

FIG. 14 is a XIV-XIV cross-sectional schematic view of an optical sub-filter of an embodiment illustrated in FIG. 13 of the present disclosure.

DETAILED DESCRIPTION

The following will provide a further detailed description of the present disclosure in conjunction with the accompanying drawings and embodiments. It is particularly pointed out that the following embodiments are only used to illustrate the present disclosure, but do not limit the scope of the present disclosure. Similarly, the following embodiments are only partial and not all of embodiments of the present disclosure. All other embodiments obtained by one of ordinary skill in the art without creative efforts fall within the scope of protection of the present disclosure.

The reference to "embodiment" in the present disclosure means that specific features, structures, or characteristics described in conjunction with the embodiment can be included in at least one embodiment of the present disclosure. The phrase appearing in various positions in the present disclosure does not necessarily refer to the same embodiment, nor is it an independent or alternative embodiment that is mutually exclusive with other embodiments. One of ordinary skill in the art explicitly and implicitly understands that the embodiments described in the present disclosure can be combined with other embodiments.

With the rapid application of augmented reality (AR), virtual reality (VR), and mixed reality (MR), a near-to-eye display device has also been rapidly developed. The near-to-eye display device can achieve display effects such as virtual reality, augmented reality, mixed reality, or the like. The specific structure and implementation principle of the near-to-eye display device is introduced here.

In practical application, in addition to the near-to-eye display optical system, the near-to-eye display device inevitably includes a power supply module for supplying power; a communication module for information interaction with other terminals; a processor for controlling the power supply module, the communication module and the display assembly; a circuit board for integrally arranging the structures, such as the power supply module, the communication module, the display assembly and the processor; and mechanical structures, such as a bracket and a shell for fixing the structures and being convenient for a user to wear. These structures are not particularly limited in the embodiment.

Figure 1:
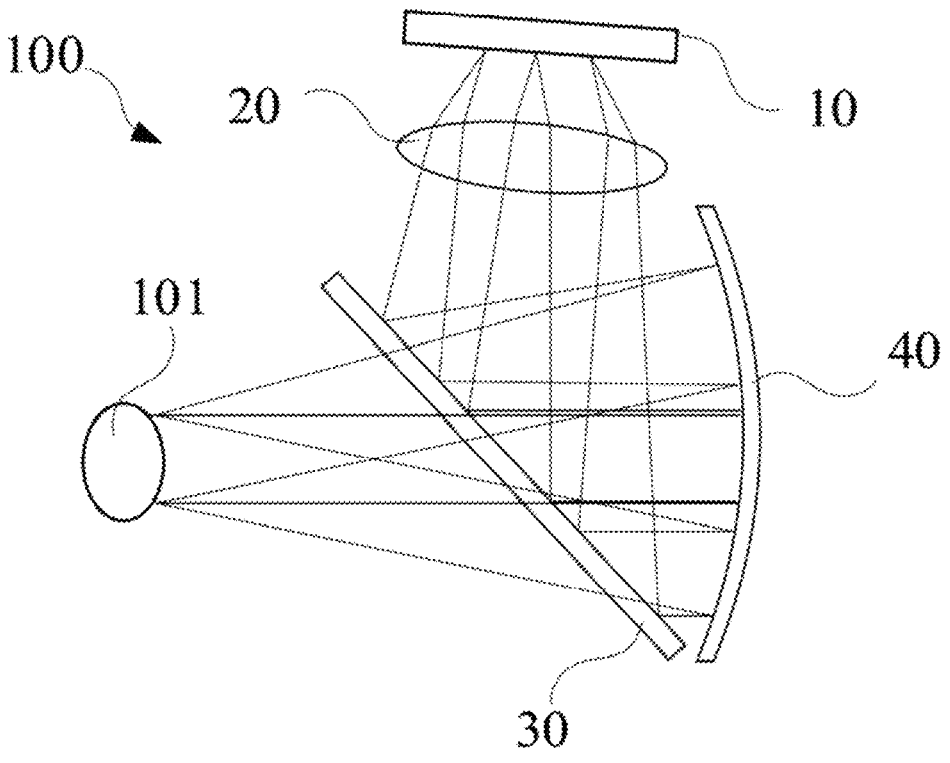
FIG. 1 is a structural schematic view of a near-to-eye display system.

As illustrated in FIG. 1, FIG. 1 is a structural schematic view of a near-to-eye display optical system. The near-to-eye display optical system 100 may include a display assembly 10 emitting light rays with virtual image information, a lens assembly 20 that receives the light rays with virtual image information and forms a virtual image on a focal plane, a first optical assembly 30 partially reflecting the light rays transmitted through the lens assembly 20, and a second optical assembly A concave surface of the second optical assembly 40 is opposite to a light splitting surface of the first optical assembly 30, and the second optical assembly 40 reflects the light rays reflected by the first optical assembly 30 and causes the light rays to pass through the first optical assembly 40. The light rays reflected by the second optical module 40 pass through the first optical module and enter the human eye 101.

In some embodiments, the display assembly 10 can be a liquid crystal display assembly based on an LCD (liquid crystal display) technology, an organic electroluminescence display assembly based on OLED (organic electroluminescence display) technology, a quantum dot light emitting diode display assembly based on QD-LED (quantum dot light emitting diodes) technology, a curved surface display assembly, or a reflective matrix liquid crystal display assembly based on LCOS (liquid crystal on silicon) technology, etc.

In some embodiments, the display assembly 10 can also be a Micro-OLED (micro-organic light-emitting diode) micro-display or a Micro-LED (micro light-emitting diode) micro-display that can emit unpolarized light rays.

Figure 2:
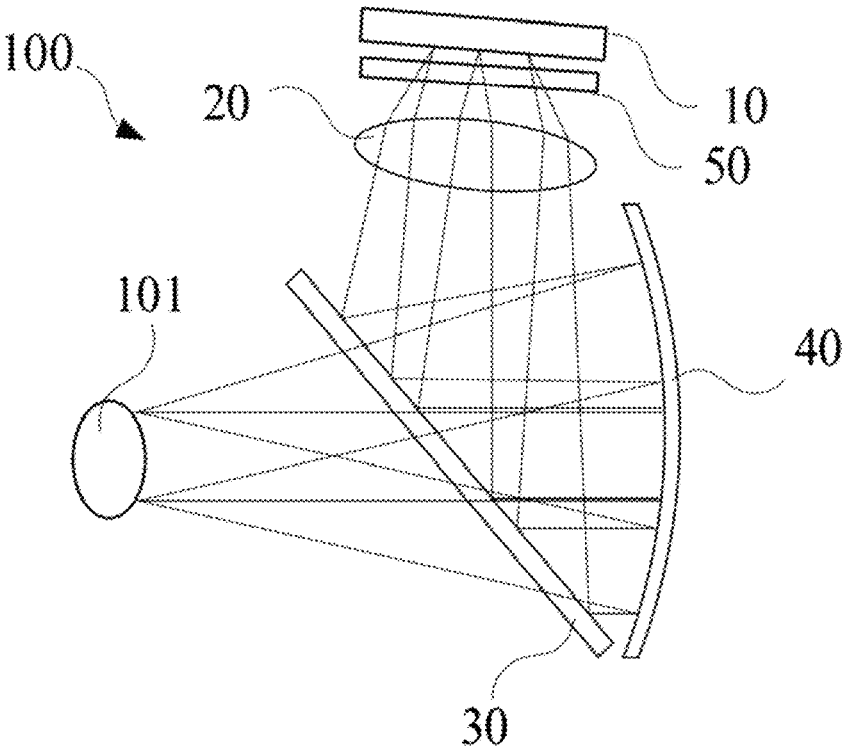
FIG. 2 is a structural schematic view of another embodiment of the near-to-eye display system.

Therefore, the near-to-eye display optical system 100 needs to perform polarization matching on unpolarized light rays in the optical path. As illustrated in FIG. 2, FIG. 2 is a structural schematic view of another embodiment of the near-to-eye display optical system 100. The near-to-eye display optical system 100 may include a polarization conversion assembly 50 disposed between the display assembly 10 and the lens assembly 20. The polarization conversion assembly may convert unpolarized light rays emitted from the display assembly 10 into linearly polarized light or circularly polarized light in a specific direction that matches the subsequent light path.

The display assembly 10 can also be a micro-display that emits polarized light, such as an LCD micro-display. The near-to-eye display optical system 100 illustrated in FIG. 2 may omit the polarization conversion assembly 50. After the polarization conversion assembly 50 is omitted in the near-to-eye display optical system 100 illustrated in FIG. 2, the polarization conversion assembly 50 or other polarization conversion device or assembly with polarization conversion function can be disposed at corresponding position to perform polarization matching of the subsequent optical path when the polarization direction needs to be determined in the subsequent optical path.

As illustrated in FIGS. 1 and 2, the lens assembly 20 has a positive refractive power. The lens assembly 20 can focus the light rays with virtual image information emitted by the display assembly 10, and perform aberration correction on the light rays with virtual image information emitted by the display assembly 10. The display assembly 10 can include at least one lens, the lens can be a positive lens or a negative lens, the lens can be made of plastic or glass, and the surface type of the lens can be a spherical surface or an aspherical surface.

In the present disclosure, "assembly having a positive refractive power" means that the entire assembly has a positive refractive power. Similarly, "assembly having a negative refractive power" means that the entire assembly has a negative refractive power. "A lens having a positive refractive power" has the same meaning as "a positive lens". "A lens having a negative refractive power" has the same meaning as "a negative lens". "Lens assembly" is not limited to a structure including multiple lenses, and "lens assembly" can be a structure including only one lens.

The first optical assembly 30 has a light splitting surface. One side surface of the first optical assembly 30 facing towards the display assembly 10 and the second optical assembly 40 is the light splitting surface. The light splitting surface of the first optical assembly 30 receives the light rays with virtual image information emitted by the display assembly 10. The light splitting surface of the first optical assembly 30 can allow a portion of the light rays with virtual image information to pass through and reflect the rest of light rays with virtual image information. The rest of light rays with virtual image information reflected by the second optical assembly 40 can pass through the first optical assembly 30 to enter the human eye 101.

In the augmented reality technology, the light rays with real image information formed in the real world can pass through the second optical assembly 40 and the first optical assembly 30, and enter the human eye 101 along with the rest of light rays with virtual image information, so that the projected virtual image can be superimposed on the user perceived real image.

The first optical assembly 30 may include a lens, such as a beam splitter mirror, and a coating film disposed on the lens, such as a light splitting film. The arrangement mode of the light splitting film is not limited, and the light splitting film may be disposed in a coating mode or a pasting mode. In practice, the coating mode is often used.

The light splitting film is located on a side of the lens facing towards the display assembly to form the light splitting surface of the first optical assembly 30. There is no limit on the light splitting ratio of the lens or light splitting film here. The light splitting ratio refers to the ratio of transmitted light rays to reflected light rays. For example, the light splitting ratio is 5:5, which means that the lens or spectral film can transmit half of the light rays and reflect half of the light rays. Of course, the light splitting ratio of the lens or the light splitting film can also be other ratios, such as 6:4, 7:3, etc., which will not be listed here.

In an embodiment, when the polarized light is used in the near-to-eye display optical system 100, the first optical assembly 30 may further include a quarter wave plate, a polarization light splitting film, a polarizing plate, a plastic or a glass substrate, etc. The plastic or glass substrate is located at a side away from the lens assembly 20 and the second optical assembly 40. The polarizing plate is attached to one side of the substrate close to the lens assembly 20 and the second optical assembly 40. The polarization light splitting film is attached to the side of the polarizing plate close to the lens assembly 20 and the second optical assembly 40. The quarter wave plate is attached to the side of the polarization light splitting film close to the lens assembly 20 and the second optical assembly 40, or the quarter wave plate is independent of the first optical assembly and located between the first optical assembly 30 and the second optical assembly 40.

The second optical assembly 40 is made of materials, such as glass, plastic, or the like. The second optical assembly 40 may be a curved mirror with a concave surface. The side with the concave surface of the second optical assembly 40 is facing towards the first optical assembly 30 to facilitate the reflection of the rest of light rays with virtual image information reflected by the first optical assembly 30 onto the first optical assembly 30. In augmented reality technology, light rays with real image information formed in the real world can pass through the second optical assembly 40 and the first optical assembly 30, and enter the human eye 101 along with the rest of light rays with virtual image information, so that the projected virtual image can be superimposed on the user perceived real image.

In an embodiment, both a "virtual image" and a "real image" may be referred to as an "image".

In an embodiment, the concave surface of the second optical assembly 40 may be a spherical surface, an aspherical surface, or a free-form surface. When the quarter wave plate exists independently of the first optical assembly 30, the quarter wave plate may be attached to the side of the second optical assembly 40 close to the first optical assembly 30 (i.e., the concave surface of the second optical assembly 40).

In an embodiment, the second optical assembly 40 may include a reflector, such as a curved mirror.

Figure 3:
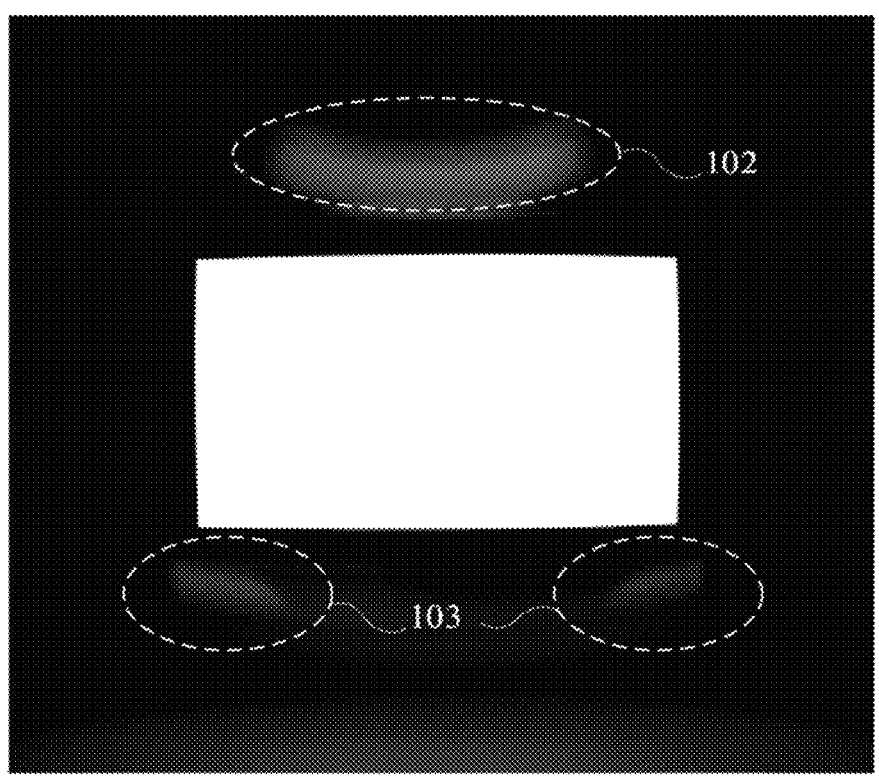
FIG. 3 is an imaging effect view of the near-to-eye display system.

As illustrated in FIG. 3, FIG. 3 is an imaging effect view of the near-to-eye display optical system 100. It can be seen that during the use of the near-to-eye display optical system 100, in the virtual image presented by the near-to-eye display optical system 100, the stray light 102 appears above the field of view, and the stray light 103 also appears below the field of view, and the appearance of the stray light 102, 103 obviously interferes with the visual experience and affects the overall experience effect of the near-to-eye display optical system 100.

In addition, in other embodiments, stray light in or out of the field of view may form, which further affects the overall experience.

In a series of scientific researches and experiments, the inventor finds that the display assembly 10 has light rays with a larger emergent angle, and part of the light rays with the larger emergent angle does not participate in the generation of a virtual image, but generates the stray light.

Figure 4:
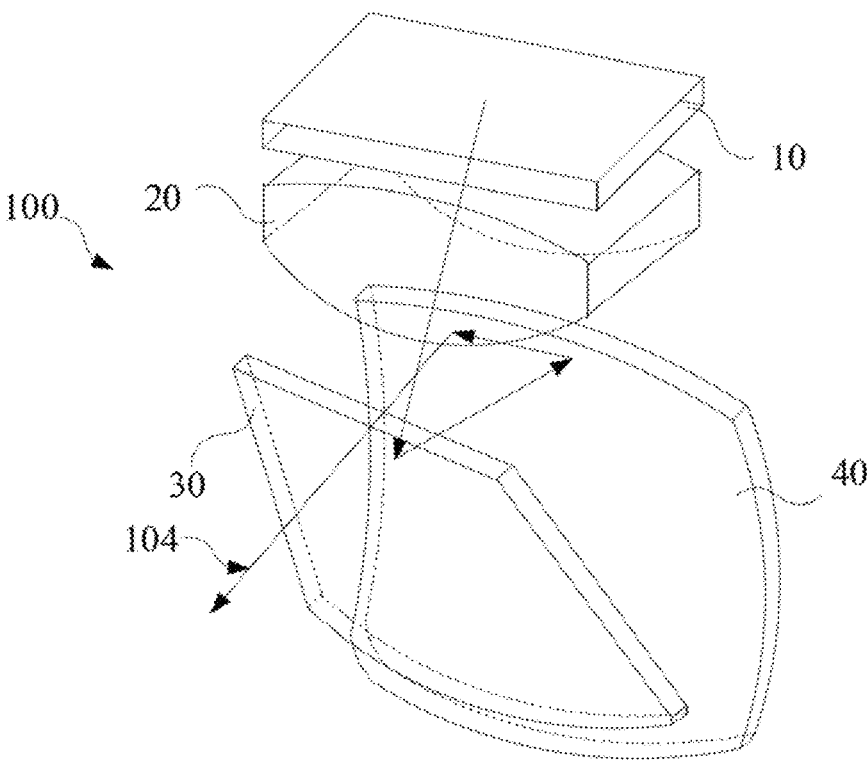
FIG. 4 is an optical path diagram of stray light generated by the near-to-eye display system.
Figure 5:
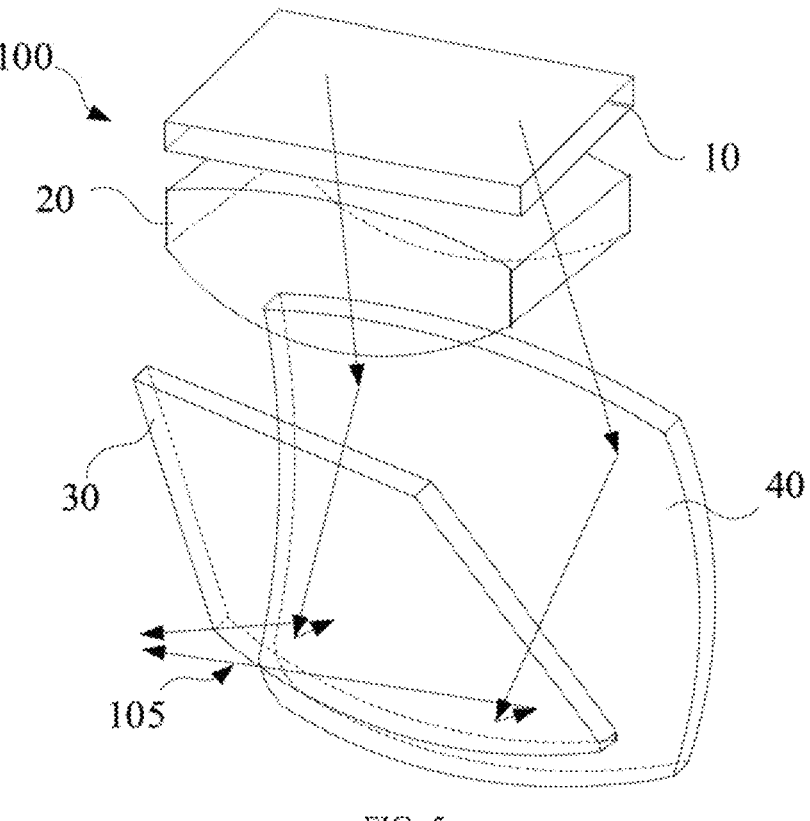
FIG. 5 is an optical path diagram of stray light generated by the near-to-eye display system.
Figure 6:
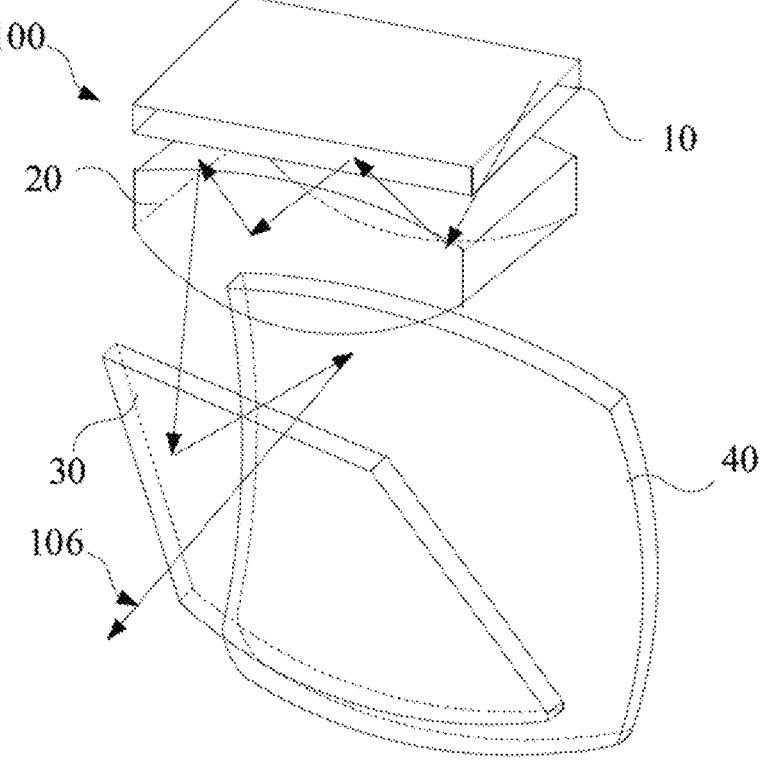
FIG. 6 is an optical path diagram of stray light generated by the near-to-eye display system.
Figure 7:
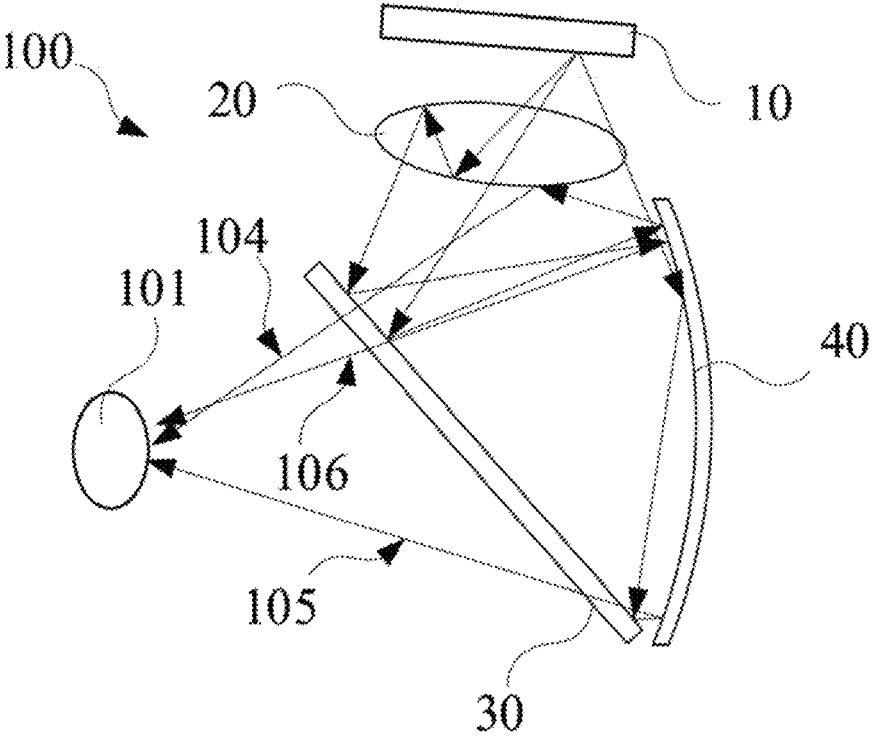
FIG. 7 is an optical path diagram of stray light generated by the near-to-eye display system.

As illustrated in FIGS. 4, 5, 6 and 7, FIG. 4 is an optical path diagram of the stray light 102 generated by the near-to-eye display optical system 100, FIG. 5 is an optical path diagram of the stray light 103 generated by the near-to-eye display optical system 100, FIG. 6 is an optical path diagram of the stray light generated by the near-to-eye display optical system 100, and FIG. 7 is an optical path diagram of the stray light generated by the near-to-eye display optical system 100. The light ray 104 is the light ray path corresponding to the stray light 102 above outside of the field of view, and the light ray 105 is the light ray path corresponding to the stray light 103 below outside of the field of view. The light ray 106 is the light ray path corresponding to the stray light formed by total reflection on two sides inside or outside of the field of view. The optical path of the stray light 102 in FIG. 3 is illustrated in FIG. 4, the corresponding generation area is the outermost side surface of the lens of the lens assembly 20 closest to the first optical assembly 30, and the middle area of one side of the reflecting surface formed by the concave surface of the second optical assembly 40 close to the lens assembly 20. The optical path of the stray light 103 in FIG. 3 is illustrated in FIG. 5, the corresponding generation area is two side areas of the reflecting surface formed by the concave surface of the second optical assembly 40 close to the upper side, and the two side areas below the first optical component 30. For the optical path of stray light within or outside of the field of view, as illustrated in FIG. 6, since the emergent angle of the display assembly 10 is larger, part of the light corresponding to the larger emergent angle will be totally reflected in the lens assembly 20, and the corresponding generation area is the inner surface of the lens assembly 20.

It can be seen that the generated stray light 102, 103 and the stray light inside and outside of the field of view can be suppressed or even eliminated by shielding the light rays 104, 105, 106.

Figure 8:
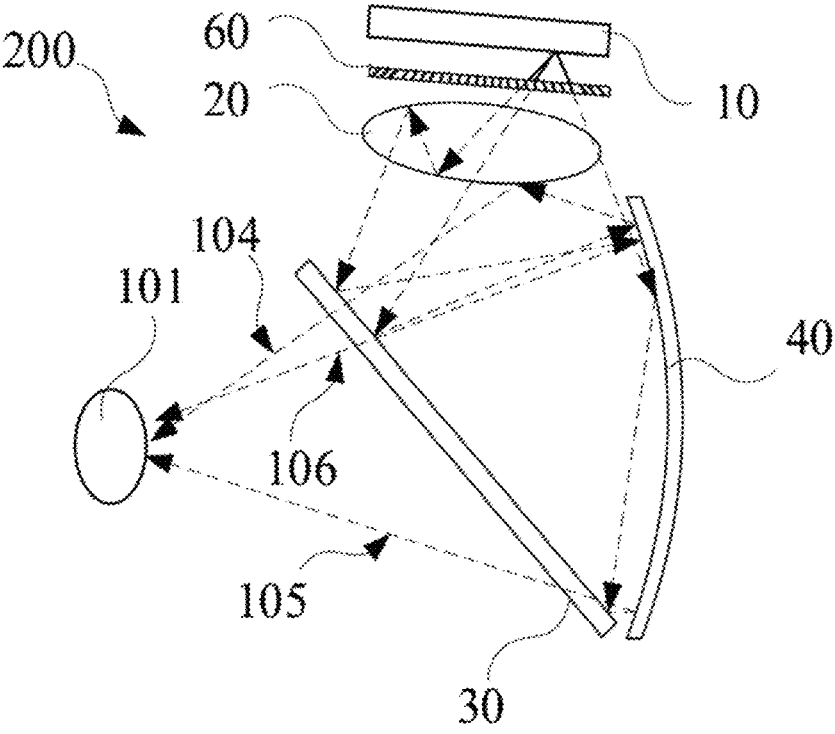
FIG. 8 is a structural schematic view of a near-to-eye display system according to an embodiment of the present disclosure.

As illustrated in FIG. 8, FIG. 8 is a structural schematic view of a near-to-eye display optical system 200 according to an embodiment of the present disclosure. The near-to-eye display optical system 200 may include the display assembly 10 emitting light rays with virtual image information, the lens assembly 20 that receives the light with virtual image information and forms a virtual image on a focal plane, the first optical assembly 30 partially reflecting the light rays transmitted through the lens assembly 20, and the second optical assembly 40. The concave surface of the second optical assembly 40 is opposite to the light splitting surface of the first optical as sembly and the second optical assembly 40 reflects the light rays reflected by the first optical assembly and causes the light rays to pass through the first optical assembly 30. The light rays reflected by the second optical module 40 passes through the first optical module 30 and enters the human eye 101.

For the display assembly 10, the lens assembly 20, the first optical assembly 30 and the second optical assembly 40, reference can be made to the above embodiments, and details are not described here.

The near-to-eye display optical system 200 further includes an optical filter 60 disposed between the display assembly 10 and the lens assembly 20. The optical filter 60 receives and transmits the light rays having the virtual image information, so that the light rays having the virtual image information pass through the lens assembly 20.

In an embodiment, the optical filter 60 is located between the display assembly 10 and the lens assembly 20, and has a certain distance from the display assembly 10. The emergent angle of the light rays emitted from the display assembly 10 can be selected, and the light rays with larger emergent angle that generates the stray light are shielded.

The emergent angle of the light rays emitted from the display assembly 10 can be converted into the incident angle of the light rays entering the optical filter 60. For example, the emergent angle of the light rays emitted from the display assembly 10 is equal to the incident angle of the light rays entering the optical filter 60, which is 90 degrees. Of course, the relationship between the emergent angle of the light rays emitted from the display assembly 10 and the incident angle of the light rays entering the optical filter 60 can be adjusted under different conditions.

In an embodiment, the optical filter 60 can transmit the light rays whose emergent angles meet the preset transmission condition. The light rays whose emergent angles do not meet the preset transmission condition (also called "first light rays") can be shielded and/or absorbed by the optical filter 60, and cannot be transmitted and passed through. The light rays 104,105,106 illustrated in FIG. 8 are shielded and actually do not continue to be transmitted when passing through the optical filter 60, thus the light rays are represented by dashed lines.

Figure 9:
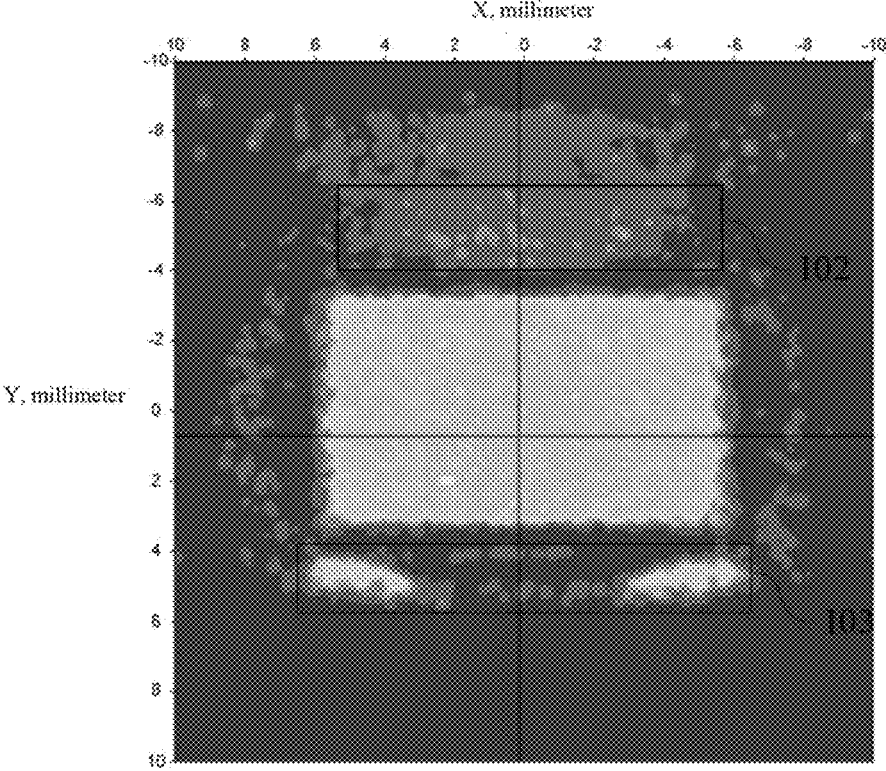
FIG. 9 is an effect diagram of a virtual image presented by the near-to-eye display system of FIG. 1.
Figure 10:
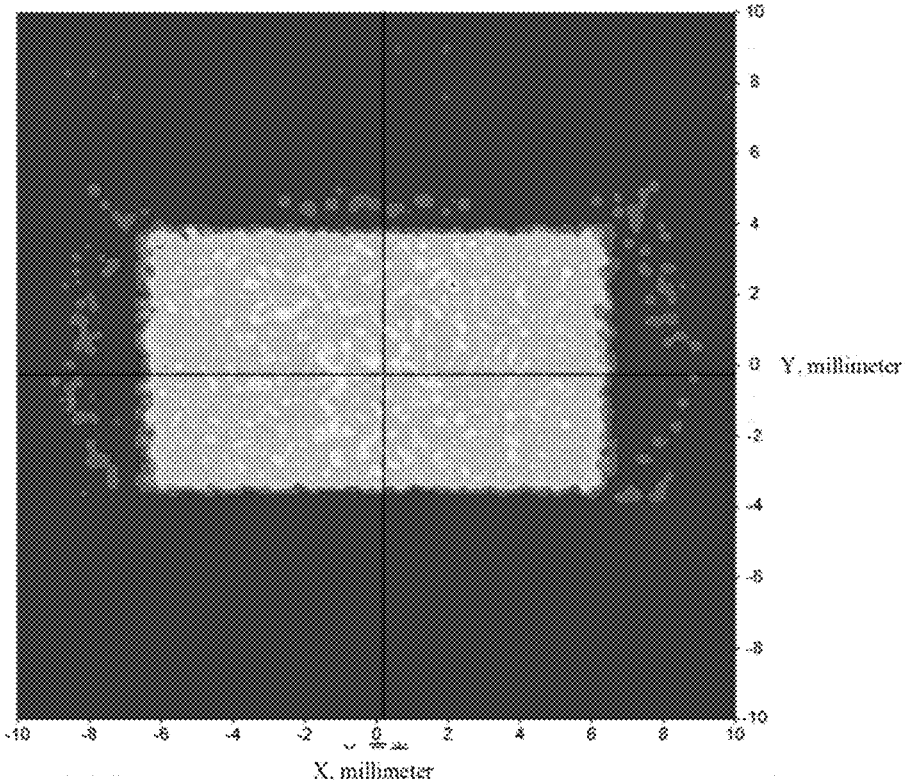
FIG. 10 is an effect diagram of a virtual image presented by the near-to-eye display system of FIG. 8 of the present disclosure.

As illustrated in FIGS. 9 and 10, FIG. 9 is an effect diagram of a virtual image presented by the near-to-eye display optical system 100 of FIG. 1. FIG. 10 is an effect diagram of a virtual image presented by the near-to-eye display optical system 200 of FIG. 8 of the present disclosure. In FIG. 9, there is the stray light 102 above the field of view, there is the stray light 103 on two sides below the field of view. In FIG. 10, the overall size of the field of view does not change significantly, the stray light above and below the field of view is suppressed, and the stray light caused by total reflection of the lens assembly 20 is also suppressed, thereby improving the user experience.

As illustrated in FIGS. 11 and 12, FIG. 11 is a structural schematic view of the optical filter 60 of an embodiment illustrated in FIG. 8 of the present disclosure. FIG. 12 is a XII-XII cross-sectional schematic view of the optical filter 60 of an embodiment illustrated in FIG. 11 of the present disclosure.

The optical filter 60 may include two optical sub-filters stacked in a first direction, such as a first optical sub-filter 61 and a second optical sub-filter 62.

The light rays with virtual image information emitted by the display assembly 10 can sequentially pass through the second optical sub-filter 62 and the first optical sub-filter 61. The first optical sub-filter 61 and the second optical sub-filter 62 are matched to select the emergent angle of the light rays emitted by the display assembly 10, so that the light rays with larger emergent angle and generating stray light can be shielded.

It needs to be pointed out that, the terms "first", "second" . . . etc. used here and below are only for descriptive purposes and cannot be understood as indicating or implying relative importance or implicitly indicating the number of technical features indicated. Therefore, the features defined by "first", "second" . . . etc. can explicitly or implicitly include one or more of the features.

The designations "first optical sub-filter", "second optical sub-filter" and "optical sub-filter" may be mutually converted in some embodiments. For example, in an embodiment, the "first optical sub-filter" in other embodiments is referred to as "second optical sub-filter", and accordingly, the "second optical sub-filter" in other embodiments is referred to as "first optical sub-filter".

In an embodiment, the first optical sub-filter 61 and the second optical sub-filter 62 may be disposed at intervals, i.e., the first optical sub-filter 61 and the second optical sub-filter 62 are disposed only in the first direction.

As illustrated in FIGS. 13 and 14, FIG. 13 is a structural schematic view of an optical sub-filter of an embodiment illustrated in FIG. 12 of the present disclosure. FIG. 14 is a XIV-XIV cross-sectional schematic view of an optical sub-filter of an embodiment illustrated in FIG. 13 of the present disclosure. The optical sub-filter, such as the first optical sub-filter 61 and the second optical sub-filter 62, may include multiple transparent layers 611 and multiple light shielding layers 612 that are alternately stacked and connected to each other in a second direction, wherein the first direction is perpendicular to the second direction.

Also As illustrated in FIG. 11, when the first optical sub-filter 61 and the second optical sub-filter 62 are stacked, the staggered stacking direction (i.e., the second direction, such as the first sub-direction) of multiple transparent layers 611 and multiple light shielding layers 612 in the optical sub-filter, such as the first optical sub-filter 61, is perpendicular to the staggered stacking direction (i.e., the second direction, such as the second sub-direction) of multiple transparent layers 611 and multiple light shielding layers 612 in the second optical sub-filter 61.

When the first optical sub-filter 61 and the second optical sub-filter 62 are stacked, for example, in the optical sub-filter, the staggered stacking direction (i.e., the second direction) of multiple transparent layers 611 and multiple light shielding layers 612 in the first optical sub-filter 61 and the staggered stacking direction (i.e., the second direction) of multiple transparent layers 611 and multiple light shielding layers 612 in the second optical sub-filter 61 may be non-parallel, i.e., have an included angle, and the included angle is greater than 0 degrees.

The designations "first direction", "second direction", "first sub-direction", "second sub-direction" and "direction" can be mutually converted in some embodiments. For example, in an embodiment, the "first direction" in other embodiments is referred to as "second direction", and accordingly, the "second sub-direction" in other embodiments is referred to as "first direction".

As illustrated in FIGS. 13 and 14, the transparent layer 611 is used for transmitting the light rays with virtual image information emitted from the display assembly 10.

The light shielding layer 612 may be made of a black material, so as to shield and absorb the light rays irradiated on the light shielding layer 612. The light shielding layer 612 can be used for selecting the emergent angle of the light rays emitted from the display assembly 10, shielding the light rays with larger emergent angle that generate the stray light. That is, the transparent layer 611 is used for transmitting the light rays whose emergent angles meet the preset transmission condition, and the light shielding layer 612 is used for shielding the light rays whose emergent angles do not meet the preset transmission condition.

The arrangement of multiple transparent layers 611 and multiple light shielding layers 612 in each optical sub-filter may form a first optical filter part 613 and two second optical filter parts 614, the first optical filter part 613 is in the middle, and each of two sides of the first optical filter part 613 is provided with one second optical filter part 614.

Specifically, the light shielding layer 612 in the first optical filter part 613 is parallel to the first direction. The included angle between the light rays shielded by the light shielding layer 612 and the first direction is greater than an angle θ, wherein the relationship between the angle θ and the image square F-number of the near-to-eye display optical system 200 is: $2 \tan θ = 1/F$.

The light shielding layer 612 located in the second optical filter part 614 is obliqued towards a side of the first optical filter part 613, and forms an angle α with the first direction. The light rays shielded by the light shielding layer 612 in the second optical filter part 614 are the light rays that form an included angle less than the angle α−θ with the first direction, and the light rays that form an included angle greater than the angle α+θ with the first direction. The included angle α ranges from 0 to θ, and θ is an included angle between an edge field of view main light rays emitted by the display assembly 10 and the first direction.

Figure 15:
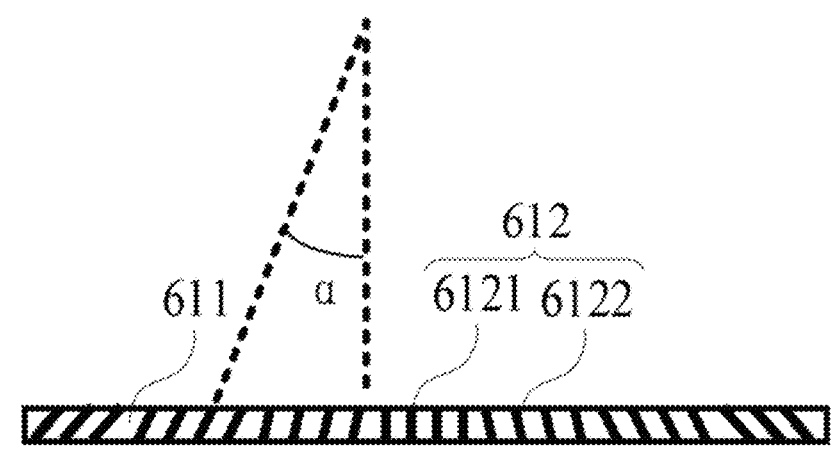
FIG. 15 is a structural schematic view of another embodiment of an optical sub-filter of an embodiment illustrated in FIG. 14 of the present disclosure.

In an embodiment, As illustrated in FIG. 15, FIG. 15 is a structural schematic view of another embodiment of an optical sub-filter of an embodiment illustrated in FIG. 14 of the present disclosure. The multiple light shielding layers 612 may include a first light shielding layer 6121 disposed parallel to the first direction, and multiple second light shielding layers 6122 disposed on two sides of the first light shielding layer 6121.

Each of the second light shielding layers 6122 is obliqued towards one side of the first light shielding layer 6121. In two adjacent second light shielding layers 6122, the second light shielding layer 6122 close to the first light shielding layer 6121 forms a first included angle with the first direction, and the second light shielding layer 6122 away from the first light shielding layer 6121 forms a second included angle with the first direction. The first included angle is less than or equal to the second included angle.

The designations "first included angle", "second included angle", "third included angle", "fourth included angle", "fifth included angle", "sixth included angle" and "included angle" can be mutually converted in some embodiments. For example, in an embodiment, the "first included angle" in other embodiments is referred to as the "second included angle", and accordingly, the "second included angle" in other embodiments is referred to as the "third included angle".

In an embodiment, each of the second light shielding layers 6122 forms an included angle α with the first direction. The second light shielding layer 6122 is used for shielding light having an included angle smaller than the angle α−θ with the first direction, and is used for shielding light having an included angle greater than angle α+θ with the first direction. The included angle α ranges from 0 to θ, and θ is an included angle between the edge field of view main light rays emitted by the display assembly 10 and the first direction. The relationship between the angle θ and the image square F-number of the near-to-eye display optical system 100, 200 is: $2 \tan θ = 1/F$.

In an embodiment, the first optical sub-filter 61 and the second optical sub-filter 62 are glued together.

In an embodiment, the optical filter 60 may be spaced apart from the lens assembly 20, and the optical filter 60 may also be bonded on the lens assembly 20.

In an embodiment, the first optical sub-filter 61 and the second optical sub-filter 62 are integrally formed.

In an embodiment, the light shielding layer 612 in the first optical sub-filter 61 extends into the second optical sub-filter 62, and is stacked with the light shielding layer 612 in the second optical sub-filter 62. The light shielding layer 612 in the second optical sub-filter 62 extends into the first optical sub-filter 61, and is stacked with the light shielding layer 612 in the first optical sub-filter 61, so as to reduce the thickness of the optical filter 60, thereby reducing the loss of effective light.

Figure 16:
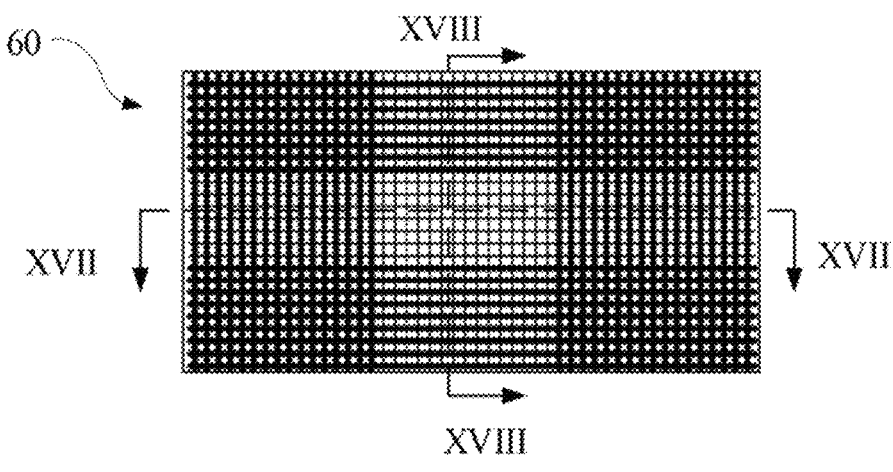
FIG. 16 is a structural schematic view of another embodiment of the optical filter of an embodiment illustrated in FIG. 8 of the present disclosure.
Figure 17:
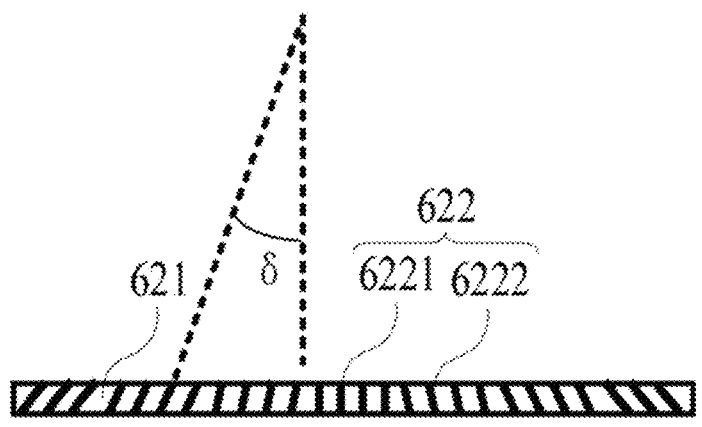
FIG. 17 is a XVII-XVII cross-sectional schematic view of an optical filter of an embodiment illustrated in FIG. 16 of the present disclosure.
Figure 18:
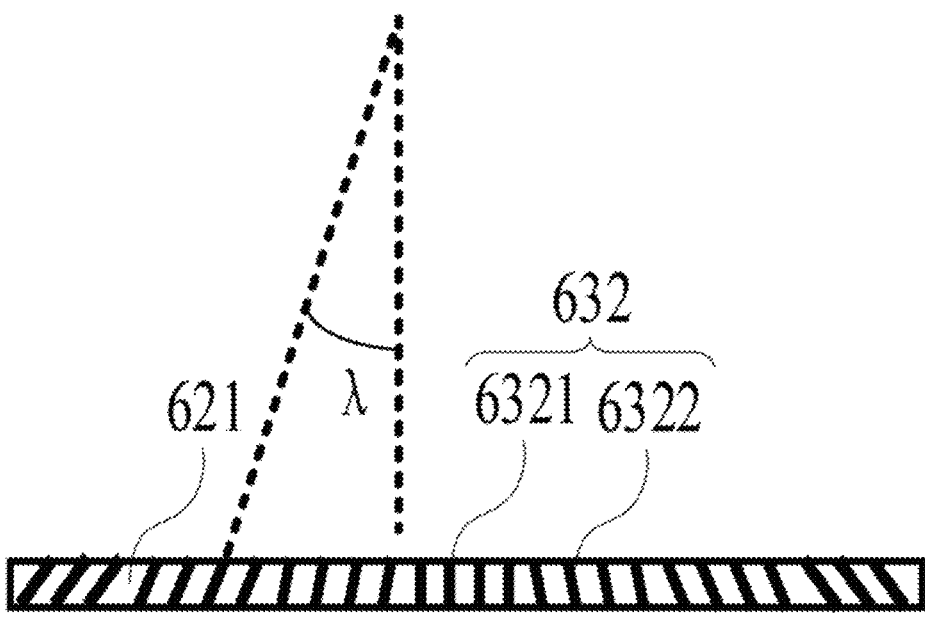
FIG. 18 is a XVIII-XVIII cross-sectional schematic view of an optical filter of an embodiment illustrated in FIG. 16 of the present disclosure.

As illustrated in FIGS. 16, 17 and 18, FIG. 16 is a structural schematic view of another embodiment of the optical filter 60 of an embodiment illustrated in FIG. 8 of the present disclosure. FIG. 17 is a XVII-XVII cross-sectional schematic view of the optical filter 60 of an embodiment illustrated in FIG. 16 of the present disclosure. FIG. 18 is a XVIII-XVIII cross-sectional schematic view of the optical filter 60 of an embodiment illustrated in FIG. 16 of the present disclosure. The optical filter 60 may include multiple transparent parts 621, multiple first light shielding parts 622 disposed at intervals, and multiple second light shielding parts 623 disposed at intervals. The transparent parts 621 are disposed on a plane perpendicular to the first direction. The transparent part 621 is used for transmitting the light rays whose emergent angles meet the preset transmission condition. The first light shielding part 622 and the second light shielding part 632 are used for shielding the light rays whose emergent angles do not meet the preset transmission condition. The first light shielding part 622 and the second light shielding part 632 are disposed in a cross manner, and the transparent part 621 is located in the space formed by the intersection arrangement of the first light shielding part 622 and the second light shielding part 632.

Specifically, one first light shielding part 622 is disposed between two adjacent transparent parts 621, and one transparent part 621 is disposed between two adjacent first light shielding parts 622.

One second light shielding part 632 is disposed between two adjacent transparent parts 621, and one transparent part 621 is disposed between two adjacent second light shielding parts 623.

In an embodiment, As illustrated in FIG. 17, the multiple first light shielding parts 622 include a first sub-light shielding part 6221 parallel to the first direction, and multiple second sub-light shielding parts 6222 disposed on two sides of the first sub-light shielding part 6221.

Specifically, each of the second sub-light shielding parts 6222 is obliqued towards one side of the first sub-light shielding part 6221. In the two adjacent second sub-shading parts 6222, the included angle between the second sub-shading part 6222 close to the first sub-shading part 6221 and the first direction is a third included angle, the included angle between the second sub-shading part 6222 away from the first sub-shading part 6221 and the first direction is a fourth included angle, and the third included angle is less than or equal to the fourth included angle.

In an embodiment, each of the second sub-light shielding parts 6222 forms an included angle δ with the first direction. The second sub-light shielding part 6222 is used for shielding the light rays whose included angles with the first direction are smaller than an angle δ−θ, and is used for shielding the light whose included angles with first direction are greater than an angle δ+θ. The included angle δ ranges from 0 to β, and the included angle β is the included angle between the edge field of view main light rays of display assembly 10 and first direction, and the relationship between the angle θ and the image square F-number of the near-to-eye display optical system 100, 200 is: $2 \tan \theta = 1/F$.

In an embodiment, As illustrated in FIG. 18, multiple second light shielding parts 632 include a third sub-light shielding part 6321 parallel to the first direction, and multiple fourth sub-light shielding parts 6322 disposed on two sides of the third sub-light shielding part 6321.

Specifically, each of the fourth sub-light shielding parts 6322 is obliqued towards one side of the third sub-light shielding part 6321. In two adjacent fourth sub-light shielding parts 6322, an included angle between the fourth sub-light shielding part 6322 close to the third sub-light shielding part 6321 and the first direction is a fifth included angle, an included angle between the fourth sub-light shielding part 6322 away from the third sub-light shielding part 6321 and the first direction is a sixth included angle, and the fifth included angle is less than or equal to the sixth included angle.

In an embodiment, each of the fourth sub-light shielding parts 6322 forms an included angle λ with the first direction. The fourth sub-light shielding part 6322 is used for shielding the light rays whose included angles with the first direction are smaller than an angle λ−θ, and is used for shielding the light rays whose included angles with first direction are greater than an angle λ+θ. The included angle λ ranges from 0 to β, and the included angle β is the included angle between the edge field of view main light rays of display assembly 10 and first direction, and the relationship between the angle θ and the image square F-number of the near-to-eye display optical system 100, 200 is: $2 \tan \theta = 1/F$.

In an embodiment, multiple first light shielding parts 622 can also be disposed according to the arrangement of the light shielding layer 612 illustrated in FIG. 14.

In an embodiment, the multiple second light shielding parts 632 can also be disposed according to the arrangement of the light shielding layer 612 illustrated in FIG. 14.

In an embodiment, the angle δ may be equal to the angle λ.

Figure 19:
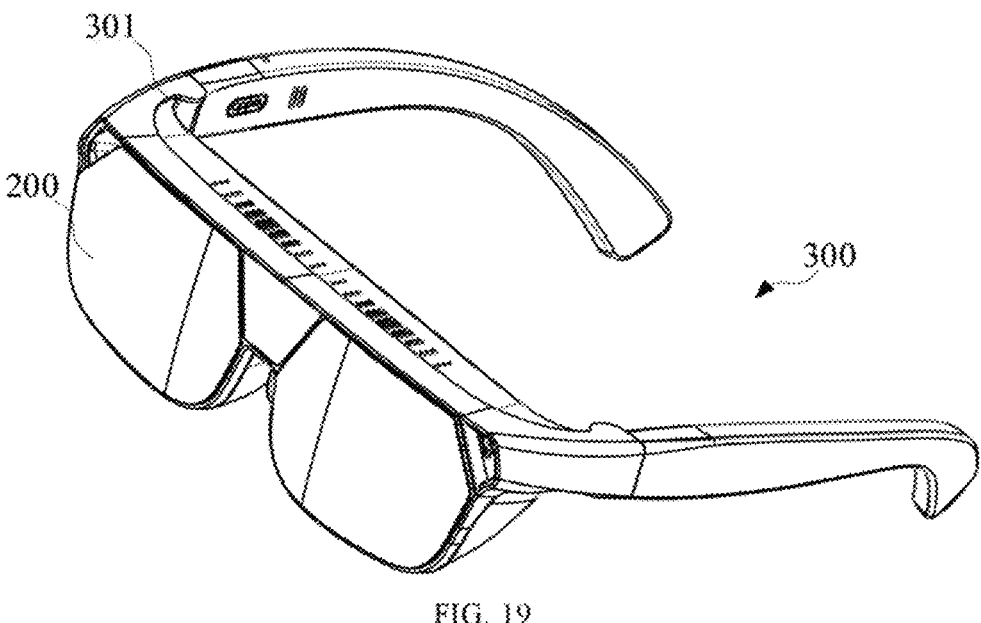
FIG. 19 is a structural schematic view of a near-to-eye display device according to another embodiment of the present disclosure.

As illustrated in FIG. 19, FIG. 19 is a structural schematic view of a near-to-eye display device 300 according to another embodiment of the present disclosure. The near-to-eye display device 300 may include a near-to-eye optical system 200 and a housing 301 in which the near-to-eye display optical system 200 is mounted. The near-to-eye display optical system 200 may include the display assembly 10 (illustrated in FIG. 8) that emits the light rays having the virtual image information, the lens assembly 20 (illustrated in FIG. 8) that receives the light with the virtual image information and forms the virtual image on the focal plane, the first optical assembly 30 (illustrated in FIG. 8) partially reflecting the light rays transmitted through the lens assembly 20, and the second optical assembly 40 (illustrated in FIG. 8). The concave surface of the second optical assembly 40 is opposite to the light splitting surface of the first optical assembly and the second optical assembly 40 reflects the light rays reflected by the first optical assembly and causes the light rays to pass through the first optical assembly 30. The light rays reflected by the second optical module 40 passes through the first optical module 30 and enters the human eye 101. Of course, the near-to-eye display optical system 200 further includes the optical filter (illustrated in FIG. 8) disposed between the display assembly 10 and the lens assembly 20. The optical filter 60 is used for receiving and transmitting the light rays having the virtual image information, so that the light rays having the virtual image information are transmitted through the lens assembly 20.

The light rays reflected by the second optical assembly 40 pass through the first optical assembly 30 and enter the human eye 101. The display assembly 10, the lens assembly 20, the first optical assembly 30, the second optical assembly 40, and the optical filter 60 in the above-mentioned embodiments may be mounted on the housing 301.

The present disclosure provides the optical filter, so that the light rays whose emergent angles meet a preset transmission condition are transmitted, and the light rays whose emergent angles do not meet the preset transmission condition are shielded. By selecting the light rays using the emergent angles, the light rays of the larger emergent angle that generate stray light can be reduced. The generation of stray light is suppressed, thereby reducing the stray light on both sides of the field of view, and reducing the stray light inside and outside of the field of view.

In several embodiments provided by the present disclosure, it should be understood that the disclosed method and devices may be accomplished in other ways. For example, the device implementation described above is only schematic. For example, the division of modules or units is only a logical function division, and there may be another division in actual implementation. For example, multiple units or assemblies may be combined or integrated into another system, or some features may be ignored or not executed.

The units described as separate parts may or may not be physically separated. Parts displayed as units may or may not be physical units, may be located in one place, or may be distributed on multiple network units. Some or all of the units may be selected according to actual needs to achieve the purpose of the schemes of the present embodiments.

In addition, in various embodiments of the present application, each functional unit can be integrated into one processing unit, each unit can physically exist separately, or two or more units can be integrated into one unit. The integrated units mentioned above can be realized in the form of hardware or software functional unit.

The above description is only a part of the embodiments of the present disclosure, and is not limited to the scope of the present disclosure. Any equivalent device or equivalent flow transformation made by using the contents of the specification and drawings of the present disclosure, or directly or indirectly applied to other related technical fields, is equally included in the scope of the patent protection of the present disclosure.

What is claimed is:

1. A near-to-eye display optical system, comprising:
a display assembly configured to emit light rays having image information;
an optical filter configured to transmit the light rays whose emergent angles meet a preset transmission condition and shield the light rays whose emergent angles do not meet the preset transmission condition;
a first optical assembly configured to receive and reflect the light rays transmitted through the optical filter, wherein the optical filter is disposed between the display assembly and the first optical assembly; and
a second optical assembly configured to receive the light rays reflected by the first optical assembly and reflect the light rays to the first optical assembly, wherein the light rays reflected by the second optical assembly pass through the first optical assembly to form an image on a focal plane of the near-to-eye display optical system.

2. The near-to-eye display optical system according to claim 1, wherein
the optical filter comprises an optical sub-filter configured to transmit the light rays whose emergent angles meet the preset transmission condition, and the optical sub-filter comprises a plurality of transparent layers and a plurality of light shielding layers stacked in a first direction;
the plurality of transparent layers and the plurality of light shielding layers are mutually connected, one light shielding layer is disposed between adjacent two of the plurality of transparent layers, and one transparent layer is disposed between adjacent two of the plurality of light shielding layers; and
the plurality of transparent layers is configured to transmit the light rays whose emergent angles meet the preset transmission condition, the plurality of light shielding layers is configured to shield the light rays comprising first light rays, and the first light rays are the light rays whose emergent angles do not meet the preset transmission condition.

3. The near-to-eye display optical system according to claim 2, wherein
the plurality of transparent layers and the plurality of light shielding layers are stacked on each other and form a first optical filter part and two second optical filter parts; the first optical filter part is in a middle, and each of two sides of the first optical filter part is provided with one second optical filter part; and
the first optical filter part and the second optical filter part are connected with each other, the plurality of light shielding layers in the first optical filter part are parallel to a second direction, and the first direction is perpendicular to the second direction.

4. The near-to-eye display optical system according to claim 3, wherein the plurality of light shielding layers in the first optical filter part is configured to shield the light rays whose included angles with the second direction are greater than an angle θ, and a relationship between the angle θ and an image square F-number of the near-to-eye display optical system is:

$$2 \tan \theta = 1/F.$$

5. The near-to-eye display optical system according to claim 4, wherein the light shielding layer in the second optical filter part is obliquely disposed towards one side of the first optical filter part and forms an included angle α with the second direction.

6. The near-to-eye display optical system according to claim 5, wherein the plurality of light shielding layers in the second optical filter part is configured to shield the light rays whose included angles with the second direction are smaller than an angle α−θ, and is configured to shield the light rays whose included angles with the second direction are greater than an angle α+θ; and the included angle α ranges from 0 to β, and the included angle β is an included angle between an edge field of view main light rays emitted by the display assembly and the second direction.

7. The near-to-eye display optical system according to claim 2, wherein the plurality of light shielding layers comprises:
a first light shielding layer parallel to a second direction, wherein the first direction is perpendicular to the second direction; and
a plurality of second light shielding layers located on two opposite sides of the first light shielding layer, wherein each of the plurality of second light shielding layers is obliquely disposed towards one side of the first light shielding layer;
wherein, in adjacent two of the plurality of second light shielding layers, an included angle between the second light shielding layer close to the first light shielding layer and the second direction is a first included angle, an included angle between the second light shielding layer away from the first light shielding layer and the second direction is a second included angle, and the first included angle is less than or equal to the second included angle.

8. The near-to-eye display optical system according to claim 7, wherein
each of the plurality of second light shielding layers forms an included angle α with the second direction;
the plurality of second light shielding layers is configured to shield the light rays whose included angles with the second direction are smaller than an angle α−θ, and is configured to shield light rays whose included angles with the second direction are greater than an angle α+θ; and
the included angle α ranges from 0 to β, the included angle β is an included angle between an edge field of view main light rays of the display assembly and the second direction, and a relationship between an angle θ and an image square F-number of the near-to-eye display optical system is:

$$2 \tan \theta = 1/F.$$

9. The near-to-eye display optical system according to claim 2, wherein the number of the optical sub-filter is two, named as a first optical sub-filter and a second optical sub-filter respectively, and the first optical sub-filter and the second optical sub-filter are disposed in the second direction.

10. The near-to-eye display optical system according to claim 9, wherein the first optical sub-filter and the second optical sub-filter are stacked in the second direction.

11. The near-to-eye display optical system according to claim 9, wherein a direction in which the plurality of transparent layers and the plurality of light shielding layers of the first optical sub-filter are stacked is a first sub-direction, a direction in which the plurality of transparent layers and the plurality of light shielding layers of the second optical sub-filter are stacked is a second sub-direction, and the first sub-direction is perpendicular to the second sub-direction.

12. The near-to-eye display optical system according to claim 1, wherein the optical filter comprises:

a plurality of transparent parts disposed on a plane perpendicular to a second direction, wherein the plurality of transparent parts is configured to transmit the light rays whose emergent angles meet a preset transmission condition;

a plurality of first light shielding parts disposed at intervals and configured to shield light rays comprising first light rays, wherein the first light rays are the light rays whose emergent angles do not meet the preset transmission condition, one of the plurality of first light shielding parts is disposed between adjacent two of the plurality of transparent parts, and one of the plurality of transparent parts is disposed between adjacent two of the plurality of first light shielding parts; and a plurality of second light shielding parts disposed at intervals and configured to shield light rays whose emergent angle do not meet the preset transmission condition, one of the plurality of second light shielding parts is disposed between adjacent two of the plurality of transparent parts, and one of the plurality of transparent parts is disposed between adjacent two of the plurality of second light shielding parts.

13. The near-to-eye display optical system according to claim 12, wherein each of the plurality of first light shielding parts comprise:

a first sub-light shielding part parallel to the second direction; and a plurality of second sub-light shielding parts located on two opposite sides of the first sub-light shielding part, wherein each of the plurality of second sub-light shielding parts is obliquely disposed towards one side of the first sub-light shielding part;

wherein in adjacent two of the plurality of second sub-light shielding parts, an included angle between the second sub-light shielding part close to the first sub-light shielding part and the second direction is a third included angle, an included angle between the second sub-light shielding part away from the first sub-light shielding part and the second direction is a fourth included angle, and the third included angle is less than or equal to the fourth included angle.

14. The near-to-eye display optical system according to claim 13, wherein each of the plurality of second sub-light shielding parts forms an included angle $\delta$ with the second direction;

the plurality of second sub-light shielding parts is configured to shield light rays whose included angles with the second direction are smaller than an angle $\delta-\theta$, and is configured to shield light rays whose included angles with the second direction are greater than an angle $\delta+\theta$; and the included angle $\delta$ ranges from 0 to $\beta$, the included angle $\beta$ is an included angle between an edge field of view main light rays of the display assembly and the second direction, and a relationship between an angle $\theta$ and an image square F-number of the near-to-eye display optical system is:

$$2 \tan \theta = 1/F.$$

15. The near-to-eye display optical system according to claim 12, wherein each of the plurality of second light shielding parts comprises:

a third sub-light shielding part parallel to the second direction; and a plurality of fourth sub-light shielding parts located on two opposite sides of the third sub-light shielding part, wherein each of the plurality of fourth sub-light shielding parts is obliquely disposed to one side of the third sub-light shielding part;

wherein in adjacent two of the plurality of fourth sub-light shielding parts, an included angle between the fourth sub-light shielding part close to the third sub-light shielding part and the second direction is a fifth included angle, an included angle between the fourth sub-light shielding part away from the third sub-light shielding part and the second direction is a sixth included angle, and the fifth included angle is less than or equal to the sixth included angle.

16. The near-to-eye display optical system according to claim 15, wherein each of the plurality of fourth sub-light shielding parts forms an included angle $\lambda$ with the second direction, the plurality of fourth sub-light shielding parts is configured to shield light rays whose included angles with the second direction are smaller than an angle $\lambda-\theta$, and configured to shield light rays whose included angles with the second direction are greater than an angle $\lambda+\theta$; and the included angle $\lambda$ ranges from 0 to $\beta$, the included angle $\beta$ is an included angle between an edge field of view main light rays of the display assembly and the second direction, and a relationship between an angle $\theta$ and an image square F-number of the near-to-eye display optical system is:

$$2 \tan \theta = 1/F.$$

17. The near-to-eye display optical system according to claim 1, further comprising:

a lens assembly, disposed between the optical filter and the first optical assembly, configured to receive and transmit the light rays passing through the optical filter, and configured to focus the light beam, wherein the first optical assembly is configured to receive and reflect light rays focused by the lens assembly.

18. The near-to-eye display optical system according to claim 17, wherein the optical filter is bonded on the lens assembly.

* * * * *